United States Patent
Lähtevänoja et al.

(10) Patent No.: US 11,800,877 B2
(45) Date of Patent: Oct. 31, 2023

(54) METHOD FOR PRODUCING A MILK-BASED PRODUCT WITH REDUCED PLASMIN-ACTIVITY

(71) Applicant: VALIO LTD., Helsinki (FI)

(72) Inventors: Saara Lähtevänoja, Tolkkinen (FI); Harri Kallioinen, Helsinki (FI)

(73) Assignee: VALIO LTD., Helsinki (FI)

( * ) Notice: Subject to any disclaimer, the term of this patent is extended or adjusted under 35 U.S.C. 154(b) by 342 days.

(21) Appl. No.: 15/755,334

(22) PCT Filed: Aug. 31, 2016

(86) PCT No.: PCT/FI2016/050603
§ 371 (c)(1),
(2) Date: Feb. 26, 2018

(87) PCT Pub. No.: WO2017/037344
PCT Pub. Date: Mar. 9, 2017

(65) Prior Publication Data
US 2018/0255798 A1    Sep. 13, 2018

(30) Foreign Application Priority Data
Aug. 31, 2015 (FI) ........................... 20155622

(51) Int. Cl.
*A23C 9/00*    (2006.01)
*A23C 9/142*   (2006.01)
(Continued)

(52) U.S. Cl.
CPC ............ *A23C 9/1422* (2013.01); *A23C 3/005* (2013.01); *A23C 3/02* (2013.01); *A23J 1/20* (2013.01);
(Continued)

(58) Field of Classification Search
None
See application file for complete search history.

(56) References Cited

FOREIGN PATENT DOCUMENTS

| CN | 102595915 | 7/2012 |
|---|---|---|
| CN | 102630803 | 8/2012 |

(Continued)

OTHER PUBLICATIONS

Burrington, K.J.,"Technical Report: Milk Fractionation Technology and Emerging Milk Protein Opportunities", U.S. Dairy Export Council, 2013, pp. 1-8. (Year: 2013).*

(Continued)

*Primary Examiner* — Elizabeth Gwartney
(74) *Attorney, Agent, or Firm* — Robert P. Michal, Esq.; Carter, DeLuca & Farrell LLP

(57) ABSTRACT

The present invention relates to a method of inactivation of plasmin enzyme in a milk-based product, wherein casein and whey protein are separated from a milk raw material by microfiltration to provide a casein concentrate as a microfiltration retentate having a whey protein content of less than 20 wt. %, based on the total protein content of the concentrate, and a whey protein concentrate as a microfiltration permeate; the casein concentrate is subjected to a thermal treatment at a temperature in the range of about 72° C. to about 95° C. to provide a thermally treated casein concentrate; and a milk-based product with a reduced plasmin activity comprising the thermally treated casein concentrate is provided. The milk-based products prepared by the method retain flawless organoleptic properties at different storage temperatures even under prolonged storage periods.

16 Claims, 1 Drawing Sheet

(51) Int. Cl.
  *A23C 3/00*   (2006.01)
  *A23J 1/20*   (2006.01)
  *A23J 3/10*   (2006.01)
  *A23C 3/02*   (2006.01)
  *A23J 3/08*   (2006.01)

(52) U.S. Cl.
  CPC .............. *A23J 1/202* (2013.01); *A23J 3/08* (2013.01); *A23J 3/10* (2013.01); *C12Y 304/21007* (2013.01); *A23C 2210/20* (2013.01)

(56) References Cited

FOREIGN PATENT DOCUMENTS

| | | | |
|---|---|---|---|
| EP | 2152087 B1 † | 5/2008 | |
| EP | 2 183 976 | 5/2010 | |
| WO | 97/49295 A1 † | 12/1997 | |
| WO | WO 2009/000972 | 12/2008 | |
| WO | WO 2010/085957 | 8/2010 | |
| WO | WO 2011/051557 | 5/2011 | |
| WO | WO 2012/010699 | 1/2012 | |
| WO | 2014/114709 A2 † | 7/2014 | |
| WO | WO 2014/114709 | 7/2014 | |

OTHER PUBLICATIONS

Decision to Grant issued in RU Appln. No. 2018110798/10 dated Sep. 23, 2019 (w/ translation).
International Search Report for PCT/FI2016/050603 dated Dec. 20, 2016, 5 pages.
Written Opinion of the ISA for PCT/FI2016/050603 dated Dec. 20, 2016, 8 pages.
Search Report for FI 20155622 dated Mar. 7, 2016, 2 pages.
Aaltonen et al. "Effect of Microfiltration of Milk on Plasmin Activity", International Dairy Journal, Elsevier Applied Science, vol. 21, No. 4, 2011, pp. 193-197.
Saint Denis et al. "Heat Inactivation Of Native Plasmin, Plasminogen And Plasminogen Activators In Bovine Milk: A Revisited Study", Le Lait, vol. 8, Nov. 1, 2001, pp. 715-729.
Korycka-Dahl et al."Plasmin activity in milk" Database Fsta [Online] International Food Information Service (IFIS), XP002764788, 1 page.
Ismail et al. "Invited Review: Plasmin Protease In Milk: Current Knowledge And Relevance To Dairy Industry", Journal Of Dairy Science, vol. 93, No. 11, Nov. 1, 2010, pp. 4999-5009.
Rollema et al. "The Alkaline Milk Proteinase System: Kinetics and Mechanism of Heat-Inactivation" Milchwissenschaft, vol. 41, No. 9, 1986, pp. 536-540.
Office Action dated Dec. 20, 2018, in a corresponding Finnish Patent Application No. 20155622 (7 pages).
Korycka-Dahl et al., "Plasmin Activity in Milk" *Journal of Dairy Science*, vol. 66, No. 4: 704-711 (1983).
Laemmli, "Cleavage of Structural Proteins during the Assembly of the Head of Bacteriophage T4" *Nature*, vol. 227: 680-685 (Aug. 15, 1970).
Matsubara et al., "Crystalline Bacterial Proteinase: II. General Properties of Crystalline Proteinase of Bacillus Subtilis N'" *The Journal of Biochemistry*, vol. 45, No. 4: 251-258 (1958).
Syväoja et al., "Determination of Colostral Immunoglobulins by Gel Filtration Chromatography" *International Dairy Federation*, IDF Special issue 9404: 216-219 (1994).
Office Action issued in CN Appln, No. 201680049813.7 dated May 27, 2020 (w/ translation).
Bong, D.D. and Moraru, C.I., "Use of micellar concentrate for Greek-style yogurt manufacturing: Effects on processing and product properties," J. Dairy Sci., 97:1259-1269 (2014).†
Van Asselt, A.J. et al., "Extreme high-temperature treatment of milk with respect to plasmin inactivation," International Dairy Journal, 18:531-538 (2008).†

\* cited by examiner
† cited by third party

METHOD FOR PRODUCING A MILK-BASED PRODUCT WITH REDUCED PLASMIN-ACTIVITY

This application is the U.S. national phase of International Application No. PCT/FI2016/050603 filed Aug. 31, 2016, which designated the U.S. and claims priority to FI Patent Application No. 20155622 filed Aug. 31, 2015, the entire contents of each of which are hereby incorporated by reference.

FIELD OF THE INVENTION

The present invention relates to a method for producing milk-based products. The method provides milk-based products with long shelf life in which good organoleptic properties are retained.

BACKGROUND OF THE INVENTION

Ultra high temperature (UHT) treatment is a well-known process in the dairy field to provide milk products with extended shelf life at ambient temperatures. The UHT treatment can be carried out for example at a temperature of 135° C. or above and in a time period of more than 1 sec. The UHT treatment destroys pathogenic and spoilage microbes and their spores in milk. However, the UHT treatment does not necessarily inactivate enzymes included in milk which can be naturally present in milk or derived from microbes. An example of these enzymes is an indigenous milk protease, i.e. plasmin, which is bound to casein micelles in milk. It is characteristic of plasmin that its activity is low at low temperatures but is strongly increased at a room temperature. Plasmin enzyme is heat-stable and can remain active even under UHT treatment. The shelf life of milk products which are stored at a room temperature is restricted by the presence of plasmin which splits casein into smaller compounds causing a bitter taste or structural defects to milk.

β-lactoglobulin present in milk is a natural inhibitor of plasmin. Inactivation of plasmin typically needs a severe heat treatment, such as a prolonged heat treatment. In the prolonged heat treatment β-lactoglobulin is extensively denaturated and has an adverse effect on the organoleptic properties of milk, the milk typically having a strong cooked or even burnt flavour. Without wishing to be bound by theory, it is believed that β-lactoglobulin reacts with plasmin during heat treatment and inactivates it. The presence of plasmin generally impairs the organoleptic properties of a milk product, especially when stored at an ambient temperature for a prolonged period. Plasmin has to be sufficiently inactivated in order to retain good organoleptic properties of milk during the whole selling period.

WO 2010/085957 A1 discloses a method for producing long shelf life milk products, wherein milk is subjected to physical separation of microorganisms and a high temperature treatment at 140-180° C. for a period of at most 200 msec.

WO 2012/010699 A1 discloses a method for producing long shelf life milk products with a reduced lactose content, wherein lactose-reduced milk is subjected to a high temperature treatment at 140-180° C. for a period of at most 200 msec.

WO 2009/000972 A1 discloses a process for producing well-preserving low-lactose or lactose-free milk products. Proteins and sugars of milk are first separated into different fractions, and then ultra high temperature treated separately. After the UHT treatment, the fractions are recombined. It is reported that the plasmin enzyme system can be inactivated and Maillard browning reactions can be avoided, whereby defects in taste, colour and structure of the UHT treated milk products can be avoided.

There is a need for a simple, efficient and economic process for preparing long shelf life milk products at different storage temperatures which are completely flawless in taste.

BRIEF DESCRIPTION OF THE INVENTION

In the present invention, the term "milk raw material" may be milk as such obtained from an animal, such as a cow, sheep, goat, camel, mare or any other animal that produces milk suitable for human consumption, or any liquid component derived therefrom;

the term "whey protein" has an explicit meaning which is well-known to a person skilled in the art, and means a protein fraction of milk which does not precipitate at the pH 4.6. The term "whey" encompasses sweet whey and acid whey derived from cheesemaking or casein manufacture, and ideal whey obtained from various membrane filtrations of milk, such as microfiltration, ultrafiltration, nanofiltration, reverse osmosis, diafiltration; chromatography; crystallization; or a combination thereof;

the term "milk origin carbohydrate" means mainly lactose but can include other sugars, such as galactooligosaccharides and lactose hydrolysis products, i.e. glucose and galactose;

the term "whey protein concentrate" is a fraction in which proportion whey protein of total protein is higher than in the starting milk raw material used, the term "casein fraction" encompasses both the casein concentrate and the casein preparation.

An object of the present invention is to provide a method of inactivation of plasmin enzyme in a milk-based product, comprising the steps of:

providing a milk raw material, separating casein and whey protein from the milk raw material by microfiltration to provide a casein concentrate having a whey protein content of less than 20 wt. %, specifically at most about 18 wt. %, more specifically at most about 14 wt. %, still more specifically at most about 12 wt. %, even more specifically at most about 6 wt. %, based on the total protein content of the concentrate, and a whey protein concentrate as a microfiltration permeate, subjecting the casein concentrate to a thermal treatment at a temperature in the range of about 72° C. to about 95° C., specifically at about 80° C. to about 95° C., to provide a thermally treated casein concentrate, providing a milk-based product with a reduced plasmin activity, comprising the thermally treated casein concentrate.

Another object of the invention is to provide a method for producing a milk-based product with a reduced plasmin activity, comprising the steps of:

providing a casein preparation having a whey protein content of less than 20 wt. %, specifically at most about 18 wt. %, more specifically at most about 14 wt. %, still more specifically at most about 12 wt. %, even more specifically at most about 6 wt. %, based on the total protein content of the preparation, subjecting the casein preparation to a thermal treatment at a temperature in the range of about 72° C. to about 95°

C., specifically at about 80° C. to about 95° C., to provide a thermally treated casein preparation, providing a milk-based product with a reduced plasmin activity, comprising the thermally treated casein preparation.

The invention provides a method by which the plasmin enzyme activity of milk is significantly decreased. The milk-based products prepared by the method have flawless organoleptic properties at different storage temperatures.

There is a lot of literature describing separation of milk components, i.e. casein, whey protein, lactose and milk minerals, each into a different fraction by different separation techniques such as chromatography and membrane filtrations, including microfiltration, ultrafiltration, nanofiltration, diafiltration, reverse osmosis. The separated fractions can then be combined in an appropriate manner to various milk products having varying protein, lactose and mineral contents, providing desirable characteristics to the products in each case. Casein and whey protein can be separated each into a different fraction typically by microfiltration or chromatography. In microfiltration, plasmin is retained with casein molecules in the retentate side while whey protein passes through a microfiltration membrane into a permeate.

It was surprisingly found in the present invention that defects in organoleptic properties, such as taste, of the prior art milk products having extended shelf life can be avoided when casein and whey protein of milk are first separated and the inactivation procedure of plasmin by a prolonged thermal treatment is performed only on the casein fraction which has a reduced content of whey protein. After the inactivation of plasmin, the thermally treated casein fraction can be recombined with natural components of milk such as whey protein, lactose and milk minerals, and also water to provide milk products having varying protein, lactose and mineral contents and a varying ratio of casein to whey protein. By this method, heat sensitive whey proteins, especially β-lactoglobulin, may remain undenatured and no cooked flavour to the product is provided.

The invention also provides a method for preparing milk-based products which show a reduced Maillard reaction. Maillard browning products produced in the Maillard reaction have an undesirable effect on the organoleptic properties of milk products, particularly ultra high temperature (UHT) treated milk products. Since in the present invention, the casein fraction subjected to plasmin inactivation procedure contains only a low amount of lactose, Maillard reaction is weak and formation of undesirable Maillard products in the milk products are avoided.

The method of the invention provides milk-based products in which denaturation degree of whey protein and activity of plasmin are low, whereby good organoleptic properties of the products are retained.

The methods of the invention are simple, efficient and economic.

A further object of the invention is a casein fraction having a whey protein content of at most about 18 wt. %, specifically at most about 14 wt. %, more specifically at most about 12 wt. %, even more specifically at most about 6 wt. %, based on the total protein content of the casein fraction.

A still further object of the invention is a use of a casein fraction having a whey protein content of at most about 18 wt. %, specifically at most about 14 wt. %, more specifically at most about 12 wt. %, even more specifically at most about 6 wt. %, based on the total protein content of the casein fraction, for the preparation of a milk-based product with a reduced plasmin activity.

DETAILED DESCRIPTION OF THE INVENTION

Figure 1:
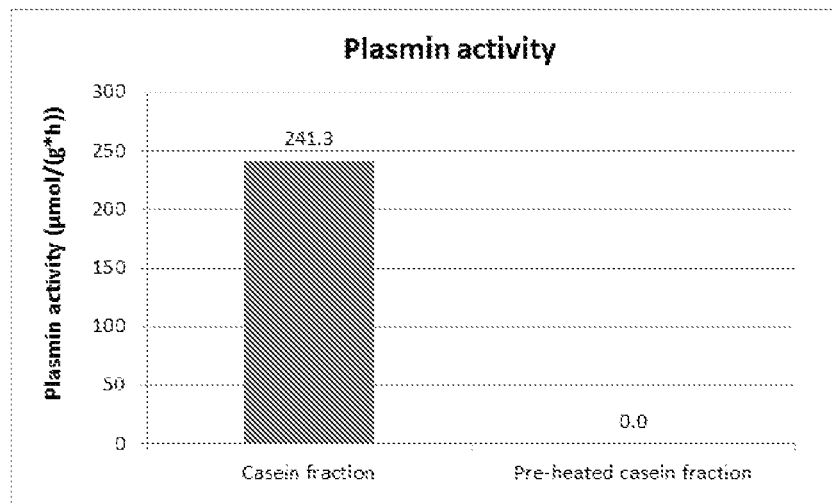
FIG. 1 shows a plasmin activity of a casein fraction before and after heat treatment.

An object of the present invention is to provide a method of inactivation of plasmin enzyme, comprising the steps of:
providing a milk raw material, separating casein and whey protein from the milk raw material by microfiltration to provide a casein concentrate having a whey protein content of less than 20 wt. %, specifically at most about 18 wt. %, more specifically at most about 14 wt. %, still more specifically at most about 12 wt. %, even more specifically at most about 6 wt. %, based on the total protein content of the concentrate, and a whey protein concentrate as a microfiltration permeate, subjecting the casein concentrate to a thermal treatment at a temperature in the range of about 72° C. to about 95° C., specifically at about 80° C. to about 95° C., to provide a thermally treated casein concentrate, providing a milk-based product with a reduced plasmin activity, comprising the thermally treated casein concentrate.

The milk raw material can be pre-processed if desired to adjust protein, fat and/or lactose content to a desired level. For example, the milk raw material can be standardized in respect of the fat, and if desired, of the protein content in a manner generally known in the art. Further, the milk raw material can be pre-treated, for example by pasteurization, in order to lower its microbial load in a manner generally known in the art. Pathogenic and spoilage microorganisms removal is generally carried out by physical separation such as microfiltration, bactofugation or a combination thereof. In an embodiment of the present invention, no physical separation of microorganisms of the milk raw material is carried out.

The milk raw material, optionally standardized (fat, protein and/or lactose) and/or pretreated for microbial removal (microfiltration, bactofugation), can be heat treated prior to separation of casein and whey. The pore size of the microfiltration membrane in microbial removal is typically in the range of 0.8 μm to 1.4 μm. Examples of suitable heat treatments include but are not limited to pasteurization, high pasteurization, or heating at a temperature lower than the pasteurization temperature for a sufficiently long time. Specifically, UHT treatment at 138° C. to about 180° C. for at least 3 sec (e.g. milk at least at 138° C., 3 to 4 sec), high pasteurization at 125° C. to 138° C. for 0.5 to 4 sec (e.g. milk at 130° C., 1 to 2 sec), pasteurization at 72° C. to 75° C. for 15 to 20 sec (e.g. milk at 72° C., 15 sec), thermisation at 57° C. to 68° C. for up to 40 minutes (e.g. at 65° C., 2 sec to 3 min), heat treatment at least at 150° C. for at most of 0.3 sec can be mentioned. The heat treatment can be either direct (steam to milk, milk to steam) or indirect (tube heat exchanger, plate heat exchanger, scraped-surface heat exchanger).

If desired, the lactose content of the milk raw material can be reduced. In an embodiment, lactose content is reduced enzymatically by adding a lactase to the raw material. Lactases typically used in the lactose hydrolysis of milk can be used. The lactose content can also be reduced by other suitable means generally known in the art, such as by means of membrane filtration, chromatography, electrodialysis, crystallization, centrifugation, or precipitation. Various techniques can be combined in an appropriate manner. The low lactose raw material can be further lactose-hydrolyzed to provide a lactose-free milk raw material.

In the present invention, the milk raw material can thus be, for instance, full-fat (whole) milk, cream, low fat milk, skim milk, buttermilk, colostrum, low-lactose milk, lactose-free milk, whey protein depleted milk, Ca depleted milk, reconstituted (recombined) milk from milk powder, or a combination thereof as such or as a concentrate and pre-treated as described above, such as heat-treated.

In an embodiment, the milk raw material is derived from bovine milk.

The milk raw material can contain fat and/or protein of vegetable origin.

In the method of the invention, the separation of casein from the milk raw material is carried out so as to provide a casein concentrate having a whey protein content of less than 20 wt. % based on the total protein content of the concentrate. In an embodiment, the whey protein content is at most about 18 wt. %. In a further embodiment, the whey protein content is at most about 14 wt. %. In a still further embodiment, the whey protein content is at most about 12 wt. %. In a specific embodiment, the whey protein content is at most about 6 wt. %.

The total solids content of the casein concentrate can be adjusted to a desired level. For example, the obtained casein concentrate can be concentrated, for instance by evaporation, up to powder.

The separation of casein and whey protein is carried out by microfiltration. The pore size of the microfiltration membrane is typically about 0.08 μm.

In an embodiment, the microfiltration is carried out at a temperature of 1° C. to 55° C. In another embodiment, the microfiltration is carried out at a temperature of 10° C. to 15° C.

In an embodiment, the microfiltration is carried out at a pressure of at most 3 bar. In a further embodiment, microfiltration is carried out at a temperature of 10° C. to 15° C. and at a pressure of less than 1.5 bar.

The separated casein concentrate is subjected to a thermal treatment at a temperature in the range of about 72° C. to about 95° C. to inactivate plasmin enzyme in the concentrate. In an embodiment, the plasmin inactivation of the casein concentrate is carried out at about 80° C. to about 95° C. In an embodiment, the plasmin inactivation of the casein concentrate is carried out at a time period of about 30 sec to about 600 sec. In another embodiment, the plasmin inactivation is carried out at a time period of about 30 sec to about 300 sec. In a further embodiment, the plasmin inactivation of the casein concentrate is carried out at a temperature in the range of about 72° C. to about 95° C. for about 30 sec to about 600 sec. In a still further embodiment, the plasmin inactivation is carried out at a temperature in the range of about 72° C. to about 95° C. for about 30 sec to about 300 sec. In a still further embodiment, the plasmin inactivation is carried out at a temperature in the range of about 80° C. to about 95° C. for about 30 sec to about 600 sec. In a still further embodiment, the plasmin inactivation is carried out at a temperature in the range of about 80° C. to about 95° C. for about 30 sec to about 300 sec. In a specific embodiment, the inactivation is carried out at about 95° C. for about 300 sec.

The casein concentrate subjected to the thermal treatment has a reduced ratio of milk origin carbohydrate to casein compared to that of normal milk. In an embodiment, the milk origin carbohydrate is lactose. In an embodiment, the ratio of milk origin carbohydrate to casein of the casein concentrate is at most about 1. In another embodiment, the ratio of milk origin carbohydrate to casein of the casein concentrate is at most about 0.5. In a further embodiment, the ratio of milk origin carbohydrate to casein of the casein concentrate is at most about 0.2.

The thermally treated casein concentrate having a reduced plasmin activity can then be combined with natural milk components of milk such as whey protein, lactose and milk minerals, and also water to provide various types of milk products. The protein, lactose and mineral contents of these products can be adjusted to desirable levels. Also, the ratio of casein to whey protein can be adjusted to that of normal milk (80/20), or to be higher or lower. The milk products can be flavoured or unflavoured.

In an embodiment, the milk-based product produced by the above method of invention comprises at least about 50 wt. % of the thermally treated casein concentrate based on the total protein content of the milk-based product. The milk components suitable for use in the preparation of the milk-based product can be available as commercial products or they can be prepared by various separation techniques, including but not limited to membrane filtrations, chromatography, precipitation, centrifugation and evaporation. Separation of various milk components by membrane filtrations, including microfiltration, ultrafiltration, nanofiltration, diafiltration, reverse osmosis, is widely described in the literature and is well known to a skilled person in the art. The milk components can be provided in the form from liquid to powder.

In another object, the invention provides a method for producing a milk-based product with a reduced plasmin activity, comprising the steps of:
  providing a casein preparation having a whey protein content of less than 20 wt. %, specifically at most about 18 wt. %, more specifically at most about 14 wt. %, still more specifically at most about 12 wt. %, even more specifically at most about 6 wt. %, based on the total protein content of the preparation,
  subjecting the casein preparation to a thermal treatment at a temperature in the range of about 72° C. to about 95° C., specifically at about 80° C. to about 95° C., to provide a thermally treated casein preparation,
  providing a milk-based product with a reduced plasmin activity, comprising the thermally treated casein preparation.

The casein preparation used in the method for producing a milk-based product can be obtained in any suitable manner. In an embodiment, the casein preparation is a casein concentrate obtained by separating casein and whey protein of the milk raw material into different fractions by microfiltration. The casein concentrate is obtained as a microfiltration retentate and a whey protein concentrate as a microfiltration permeate. The pore size of the microfiltration membrane is typically about 0.08 μm. In an embodiment, the microfiltration is carried out at a temperature of 1° C. to 55° C. In another embodiment, the microfiltration is carried out at a temperature of 10° C. to 15° C. In an embodiment, the microfiltration is carried out at a pressure of at most 3 bar.

In a further embodiment, microfiltration is carried out at a temperature of 10° C. to 15° C. and at a pressure of less than 1.5 bar.

The casein preparation used in the method for producing a milk-based product can be in the form from liquid to powder. In an embodiment, the casein preparation is the casein concentrate obtained as a microfiltration retentate and is further concentrated, for example by evaporation to have a desired totals solids content.

Also the whey protein concentrate can be further concentrated, conveniently by ultrafiltration, to provide the whey protein concentrate as an ultrafiltration retentate. The whey protein concentrate can be in the form from liquid to powder.

The casein preparation used in the method of the invention for producing a milk-based product is subjected to a similar thermal treatment as described above to inactivate plasmin enzyme in the casein concentrate. Accordingly, the thermal treatment is carried out at a temperature in the range of about 72° C. to about 95° C. for inactivation. In an embodiment, the plasmin inactivation of the casein preparation is carried out at about 80° C. to about 95° C. In an embodiment, the plasmin inactivation of the casein preparation is carried out at a time period of about 30 sec to about 600 sec. In another embodiment, the plasmin inactivation is carried out at a time period of about 30 sec to about 300 sec. In a further embodiment, the plasmin inactivation of the casein preparation is carried out at a temperature in the range of about 72° C. to about 95° C. for about 30 sec to about 600 sec. In a still further embodiment, the plasmin inactivation is carried out at a temperature in the range of about 72° C. to about 95° C. for about 30 sec to about 300 sec. In a still further embodiment, the plasmin inactivation is carried out at a temperature in the range of about 80° C. to about 95° C. for about 30 sec to about 600 sec. In a still further embodiment, the plasmin inactivation is carried out at a temperature in the range of about 80° C. to about 95° C. for about 30 sec to about 300 sec. In a specific embodiment, the inactivation is carried out at about 95° C. for about 300 sec.

The casein preparation used in the method for producing a milk-based product has a reduced ratio of milk origin carbohydrate to casein compared to that of normal milk. In an embodiment, the milk origin carbohydrate is lactose. In an embodiment, the ratio of milk origin carbohydrate to casein of the casein preparation is at most about 1. In another embodiment, the ratio of milk origin carbohydrate to casein of the casein preparation is at most about 0.5. In a further embodiment, the ratio of milk origin carbohydrate to casein of the casein preparation is at most about 0.2.

The thermally treated casein preparation having a reduced plasmin activity is combined with other milk components such as whey protein, lactose and milk minerals, and optionally with water in appropriate proportions to provide a milk-based product. The milk-based product produced by the method of the invention comprises the thermally treated casein preparation. In an embodiment, the milk-based product produced by the method of invention comprises at least about 50 wt. % of the thermally treated casein preparation based on the total protein content of the milk-based product. The milk components suitable for use in the preparation of the milk-based product can be available as commercial products or they can be prepared by various separation techniques, including but not limited to membrane filtrations, chromatography, precipitation, centrifugation and evaporation. Separation of various milk components by membrane filtrations, including microfiltration, ultrafiltration, nanofiltration, diafiltration, reverse osmosis, is widely described in the literature and is well known to a skilled person in the art. The milk components can be provided in the form from liquid to powder.

After the thermally treated casein preparation is combined with other milk components and optionally with water to provide a milk-based product with a desired protein, lactose and fat contents, the product is optionally subjected to a heat treatment which destroys the spoilage microorganisms in the product. In an embodiment, the heat treatment is carried out. Suitable heat treatments for use in the present invention are similar to those performed on the milk raw material and described above. Examples of suitable heat treatments include but are not limited to pasteurization, high pasteurization, or heating at a temperature lower than the pasteurization temperature for a sufficiently long time. Specifically, UHT treatment at 138° C. to about 180° C. for at least 3 sec (e.g. milk at least at 138° C., 3 to 4 sec), high pasteurization at 125° C. to 138° C. for 0.5 to 4 sec (e.g. milk at 130° C., 1 to 2 sec), pasteurization at 72° C. to 75° C. for 15 to 20 sec (e.g. milk at 72° C., 15 sec), thermisation at 57° C. to 68° C. for up to 40 minutes (e.g. at 65° C., 2 sec to 3 min), heat treatment at least at 150° C. for at most of 0.3 sec can be mentioned. The heat treatment can be either direct (steam to milk, milk to steam) or indirect (tube heat exchanger, plate heat exchanger, scraped-surface heat exchanger).

The protein, lactose, fat and mineral contents of the milk-based products can be adjusted to desirable levels. Also, the ratio of casein to whey protein can be adjusted to that of normal milk (80/20), or to be higher or lower of that. The milk products can be flavoured or unflavoured. The fat content of the milk-based product produced by the method of the invention is typically in the range of 0.05% to 10%, specifically 1.0% to 3.0%. The protein content of the milk-based product is at least of about 0.9%. In an embodiment, the protein content is about 0.9% to about 20%.

The milk-based products produced by the method of the invention can be dried to powder.

In an embodiment, the method of the invention comprises a lactose hydrolysis step. The lactose hydrolysis can be carried out at any appropriate step. In an embodiment, the lactose of the milk raw material is hydrolyzed prior to separation of casein and whey protein. In another embodiment, lactose is hydrolyzed after combining the thermally treated casein preparation with other milk components but before the optional heat treatment. In an embodiment, the lactose hydrolysis is carried out after the heat treatment of the milk-based product.

In an embodiment, the milk-based product is low-lactose having a lactose content of at most 1%. In another embodiment, the milk-based product is lactose-free having a lactose content of at most 0.01%.

In an embodiment, the milk-based product prepared by the method of the invention is packaged in aseptic conditions.

The method of the invention can be a continuous process or a batch process.

The milk-based product prepared by the method of the invention includes, but is not limited to, milk products with varied fat, protein and lactose contents, milk products with increased whey protein content, with increased casein content, or with increased total protein content, and mixtures thereof, infant formula and baby food both with reduced total protein content.

The milk-based product prepared by the method of the invention can be dried to powder or further processed to other milk products, including fermented and sour milk products, such as yoghurt, fermented milk, viili, fermented cream, sour cream, quark, butter milk, kefir, dairy shot drinks and cream cheese, or ice cream.

A further object of the invention is a casein fraction having a whey protein content of at most about 18 wt. %, specifically at most about 14 wt. %, more specifically at most about 12 wt. %, even more specifically at most about 6 wt. %, based on the total protein content of the casein fraction. In an embodiment, the casein fraction has a ratio of milk origin carbohydrate to casein of at most about 1. In another embodiment, the ratio of milk origin carbohydrate to casein of the casein fraction is at most about 0.5. In a further embodiment, the ratio of milk origin carbohydrate to casein of the casein fraction is at most about 0.2. The casein fraction of the invention can be used for the preparation of various milk-based products which retain flawless organoleptic properties during different storage temperatures even under prolonged storage periods.

A still further object of the invention is a use of the casein fraction having a whey protein content of at most about 18 wt. %, specifically at most about 14 wt. %, more specifically at most about 12 wt. %, even more specifically at most about 6 wt. %, based on the total protein content of the casein fraction, for the preparation of a milk-based product with a reduced plasmin activity. In an embodiment, the casein fraction has a ratio of milk origin carbohydrate to casein of at most about 1. In another embodiment, the ratio of milk origin carbohydrate to casein of the casein fraction is at most about 0.5. In a further embodiment, the ratio of milk origin carbohydrate to casein of the casein fraction is at most about 0.2.

The following examples are presented for further illustration of the invention without limiting the invention thereto. The percentages of various components in the Tables below are given on weight basis. In the examples, following analysis methods were used:

Activity of plasmin: modified method of M. Korycka-Dahl. et al. (M. Korycka-Dahl, B. Ribadeau Dumas, N. Chene, J. Martal: Plasmin activity in milk, Journal of Dairy Science, 66(4) (1983), pp. 704-711)

SDS-PAGE: according to Laemmli (1970) by using 18% Criterion TGX Precast gels (Bio-Rad, USA). Protein bands were stained with Coomassie Brilliant Blue R-250 (Bio-Rad, USA) and compared with molecular weight markers (Precision Plus Protein standards, Bio-Rad, USA). (Laemmli, U.K. Cleavage of structural proteins during the assembly of the head of bacteriophage T4. Nature 227 (1970) 680-685)

Native whey protein: Size exclusion chromatography modified (Syväoja, E.-L., Korhonen, H., Determination of colostral immunoglobulins by gel filtration chromatography, IDF Special issue 9404, International Dairy Federation, Bruessels (1994) 216-219)

Furosine: according to the IDF standard (IDF 193:2004 (E)/ISO 18329:2004(E). Milk and milk products—Determination of furosine content—Ion-pair reverse-phase high-performance liquid chromatography method, 11 p.). Furosine describes the chemical changes caused by heat treatment to protein. The higher the furosine content more significant changes have happened to the protein.

Free tyrosine equivalent: as described by Matsubara et al. (Matsubara, H., Hagihara, B., Nakai, M., Komaki, T., Yonetani, T., Okunuki, K., Crystalline bacterial proteinase II. General properties of crystalline proteinase of *Bacillus subtilis* N', J. Biochem. 45 (4) (1958) 251-258). Free tyrosine equivalent method can be used to study the level of proteolysis in the product.

Example 1. Separation of Milk by Membrane Filtration

Skim milk was ultrafiltrated by a volumetric concentration factor (VCR) of 3.7 at about 10° C. The membrane used in the ultrafiltration was Koch HKF 131 from Koch Membrane Systems, Inc. Table 1 shows the compositions of skim milk and of the obtained milk protein concentrate, that is the ultrafiltration retentate.

Example 2. Separation of Milk by Membrane Filtrations

Skim milk was microfiltrated at a temperature range from 10° C. to 15° C. at a pressure of less than 1.5 bar to concentrate casein in the microfiltration retentate. The membrane used in the microfiltration was Synder FR from Synder Filtration, Inc. The skim milk was first microfiltrated by a concentration factor of about 4. The microfiltration was then continued by means of diafiltration, in which tap water was added to the obtained microfiltration retentate in an amount equal to that of the obtained retentate. The microfiltration was continued until an equivalent amount of the obtained permeate, compared to the amount of added water, was discharged. The diafiltration step was repeated two times. Permeates obtained from the two diafiltration steps were combined and the combined mixture was ultrafiltrated at a temperature range from 10° C. to 15° C. using the Koch HKF 131 membrane to concentrate whey protein in the ultrafiltration retentate. The ultrafiltration was continued until a protein content of the retentate of 9% was reached.

The permeate of the ultrafiltration was concentrated by nanofiltration (membranes Desal DK, filtration temperature 10° C.) to concentrate lactose in the nanofiltration retentate so as to provide a total solids content (TS) of about 20% of the retentate.

The nanofiltration permeate obtained was concentrated by reverse osmosis (membranes Filmtec RO and filtration temperature about 10° C.) to concentrate minerals in the retentate. The filtration was continued until TS of the retentate was about 2.5%.

Table 1 shows the compositions of the various fractions obtained in the microfiltration, ultrafiltration, nanofiltration and reverse osmosis in Examples 1 and 2 above. Table 1 further shows the composition of cream separated from the full fat milk. All the milk components and fractions given in Table 1 can be used for the preparation of milk-based products.

TABLE 1

|  | Skim milk | Cream | Milk protein concentrate (Ex 1) | Casein concentrate (MF ret of Ex 2) | Whey protein concentrate (UF ret of Ex 2) | Lactose fraction (NF ret of Ex 2) | Mineral fraction (RO ret of Ex 2) |
|---|---|---|---|---|---|---|---|
| Fat (%) | <0.1 | 38 | 0.1 | 0.2 | <0.1 | <0.1 | <0.1 |
| Total protein (%) | 3.4 | 2.0 | 11.8 | 9.4 | 8.6 | 0.3 | 0.45 |
| NPN* (%) | 0.1 | 0.1 | 0.2 | <0.1 | 0.1 | 0.3 | 0.45 |
| Whey protein (%) | 0.5 | 0.3 | 1.8 | 0.5 | 7.0 | <0.1 | <0.1 |
| Casein (%) | 2.8 | 1.6 | 9.7 | 8.8 | 1.5 | <0.1 | <0.1 |
| Casein/total protein (%) | 82 | 80 | 82 | 94 | 17.5 | — | — |
| Lactose (%) | 4.9 | 2.8 | 4.2 | 0.6 | 2.5 | 17.5 | 0.6 |
| Lactose/casein | 1.75 | 1.75 | 0.43 | 0.07 | 1.67 | — | — |
| Ash (%) | 0.7 | 0.5 | 1.4 | 0.88 | 0.5 | 1.1 | 1.9 |
| Total solids (%) | 9.0 | 43.3 | 18.5 | 11.1 | 11.8 | 20.3 | 2.5 |

*non-nitrogen protein

Example 3. Preparation of a Skimmed Milk Product According to the Method of the Invention A skimmed milk product was prepared with the method of the invention. The casein concentrate obtained in Example 2 was thermally pre-treated by indirect heating (95° C., 5 min) to inactivate plasmin enzyme. Samples were taken from the casein concentrate before and after the thermal pre-treatment step. Plasmin activity in the casein concentrate before and after the thermal pre-treatment is presented in FIG. 1. The result shows that plasmin activity can be fully inactivated by thermal pre-treatment carried out for the casein concentrate.

The thermally pre-treated casein concentrate together with other membrane filtration fractions obtained in Example 2 was used for the preparation of a skimmed milk product. The recipe and composition of the skimmed milk product are presented in Table 2. The components were combined and thoroughly mixed. The mixture was heat-treated at 157° C. for 0.1 sec by direct steam infusion (steam infusion plant from SPX, Denmark) and packaged aseptically. The packages were stored at 20° C. and at 6° C.

TABLE 2

|  | Casein concentrate | Whey protein concentrate | Lactose fraction | Mineral fraction | Water | Skimmed milk product |
|---|---|---|---|---|---|---|
| Proportion (%) | 32.0 | 5.0 | 27.0 | 9.6 | 26.4 | 100.0 |
| Fat (%) | 0.2 | <0.1 | <0.1 | <0.1 | — | 0.1 |
| Total protein (%) | 9.4 | 8.6 | 0.3 | 0.45 | — | 3.5 |
| NPN (%) | <0.1 | 0.1 | 0.3 | 0.45 | — | 0.1 |
| Whey protein (%) | 0.5 | 7.0 | <0.1 | <0.1 | — | 0.5 |
| Casein (%) | 8.8 | 1.5 | <0.1 | <0.1 | — | 2.9 |
| Lactose (%) | 0.6 | 2.5 | 17.5 | 0.6 | — | 5.1 |
| Ash (%) | 0.88 | 0.5 | 1.1 | 1.9 | — | 0.8 |
| Casein/total protein (%) | 94 | 17.5 | — | — | — | 80 |

Plasmin activity, furosine content and the amount of native β-lactoglobulin and α-lactalbumin were determined from the sample taken from the mixture before the heat-treatment and from the heat-treated (157° C., 0.1 sec) and aseptically packaged products. The results are presented in Table 3. The plasmin activity in the mixture before the heat-treatment was already very low due to the thermal pre-treatment step. No activity was detected in the heat-treated product. Furthermore, the heat-treated product had a very low furosine content and a high content of native β-lactoglobulin and α-lactalbumin indicating minor chemical changes taking place during heat-treatment.

TABLE 3

|  | Mixture before heat-treatment | Heat-treated (157° C., 0.1 sec) product |
|---|---|---|
| Plasmin activity (μmol/(g * h)) | 2.5 | 0 |
| Furosine content (mg/kg) | 6 | 6 |
| Native β-lactoglobulin (g/100 ml) | 0.30 | 0.23 |
| Native α-lactalbumin (g/100 ml) | 0.1 | 0.1 |

Figure 2:
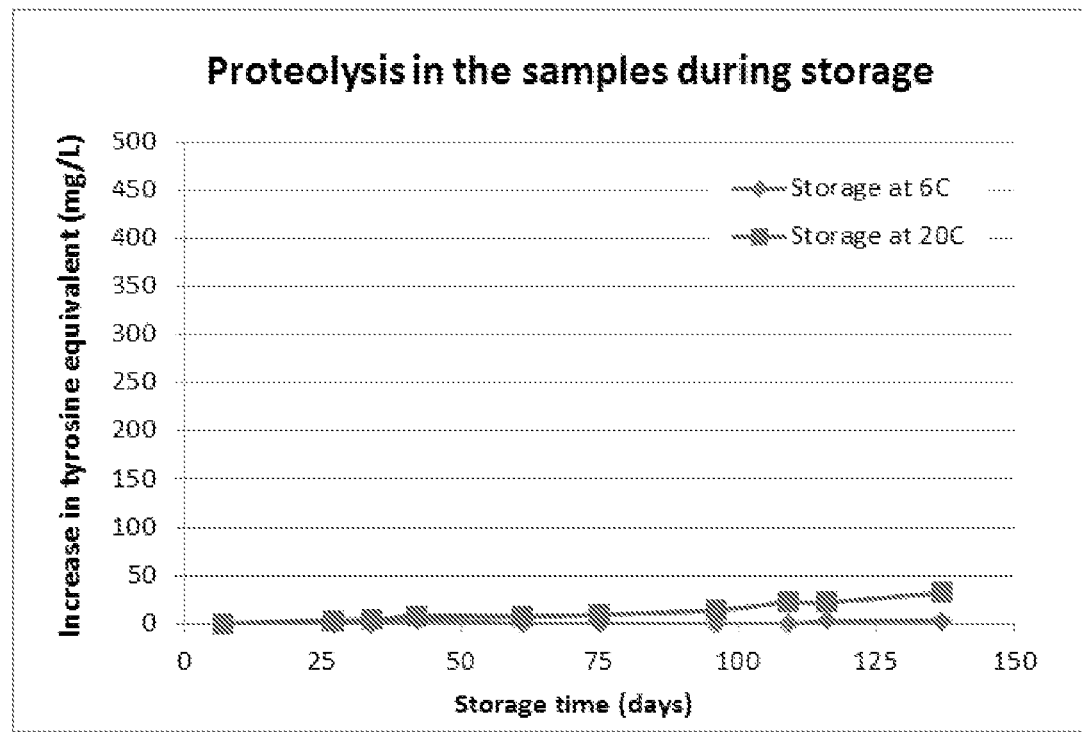
FIG. 2 shows a degree of proteolysis of a milk-based product prepared by an embodiment of the method of the invention during storage.

The degree of proteolysis during storage was evaluated by determining the tyrosine equivalent of the samples. The results are presented in FIG. 2. No significant proteolysis could be detected in the samples during storage indicating very effective plasmin inactivation by the method of the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method for producing a milk-based product with a fully inactivated plasmin activity, comprising the steps of:
   providing a milk raw material,
   separating casein and whey protein present in a milk raw material by microfiltration to provide a casein concentrate as a microfiltration retentate having a whey protein content of at most 6 wt. %, based on the total protein content of the concentrate, and a whey protein concentrate as a microfiltration permeate,
   subjecting the casein concentrate as the microfiltration retentate to a thermal treatment at a temperature in the range of about 72° C. to about 95° C. for about 30 sec to about 600 sec to provide a thermally treated casein concentrate exhibiting a fully inactivated plasmin activity,
   combining the thermally treated casein concentrate exhibiting the fully inactivated plasmin activity with; lactose, milk minerals, water, and the whey protein concentrate, to provide a milk-based product with a reduced plasmin activity,
   subjecting the milk-based product with the reduced plasmin activity to a heat treatment selected from Ultra High Temperature treatment at 138° C. to about 180° C. for at least 3 seconds, high pasteurization at 125° C. to 138° C. for 0.5 to 4 seconds, pasteurization at 72° C. to 75° C. for 15 to 20 seconds, thermisation at 57° C. to 68° C. for up to 40 minutes, and heat treatment at least at 150° C. for at most of 0.3 seconds to provide a milk-based product exhibiting a fully inactivated plasmin activity.

2. The method of claim 1, further comprising a lactose hydrolysis step.

3. The method of claim 1, wherein the milk-based product exhibiting a fully inactivated plasmin activity is aseptically packaged.

4. The method of claim 1, wherein a pore size of a microfiltration membrane is about 0.08 μm.

5. The method of claim 1, wherein the microfiltration is carried out at a temperature of 1° C. to 55° C.

6. The method of claim 1, wherein the microfiltration is carried out at a pressure of at most 3 bar.

7. The method of claim 1, wherein the microfiltration is carried out at a temperature of 10° C. to 15° C. and at a pressure of less than 1.5 bar.

8. The method of claim 1 wherein the thermal treatment of the casein concentrate is carried out in the time period of about 30 sec to about 300 sec.

9. The method of claim 1, wherein the thermal treatment of the casein concentrate is carried out at a temperature in the range of about 72° C. to about 95° C. for about 30 sec to about 300 sec.

10. The method of claim 1, wherein the casein concentrate has a ratio of milk origin carbohydrate to casein of at most about 1.

11. The method of claim 1, wherein the amount of the thermally treated casein concentrate in the milk-based product is at least about 50 wt. % based on the total protein content of the milk-based product.

12. The method of claim 1, wherein a total protein content of the casein concentrate is at least 9.4 wt %.

13. A method for producing a milk-based product, comprising the steps of:
    providing a milk raw material,
    separating casein and whey protein from the milk raw material by microfiltration to provide a casein concentrate as a microfiltration retentate having a whey protein content of at most 6 wt. %, based on the total protein content of the concentrate, and a whey protein concentrate as a microfiltration permeate,
    subjecting the casein concentrate as the microfiltration retentate to a thermal treatment at a temperature of about 95° C. for about 300 sec to provide a thermally treated casein concentrate exhibiting a fully inactivated plasmin activity,
    combining the thermally treated casein concentrate exhibiting a fully inactivated plasmin activity with lactose, milk minerals, water, and the whey protein concentrate, to provide a milk-based product with a reduced plasmin activity,
    subjecting the milk-based product with a reduced plasmin activity to an Ultra High Temperature heat treatment of 138° C. to about 180° C. for at least 3 seconds to provide a milk product exhibiting a fully inactivated plasmin activity.

14. The method of claim 13, wherein the milk raw material is skim milk.

15. The method of claim 13, wherein a total protein content of the microfiltration retentate is at least 9.4 wt %.

16. A method for producing a milk-based product, consisting of the steps of:
    providing a milk raw material,
    separating casein and whey protein from the milk raw material by microfiltration to provide a casein concentrate as a microfiltration retentate having a whey protein content of at most 6 wt. %, based on the total protein content of the concentrate, and a whey protein concentrate as a microfiltration permeate,
    subjecting the casein concentrate as the microfiltration retentate to a thermal treatment at a temperature in the range of 72° C. to about 95° C. for about 30 sec to about 600 sec to provide a thermally treated casein concentrate exhibiting a fully inactivated plasmin activity,
    combining the thermally treated casein concentrate exhibiting a fully inactivated plasmin activity with lactose, milk minerals, water, and the whey protein concentrate, to provide a milk-based product with a reduced plasmin activity,
    subjecting the milk-based product with a reduced plasmin activity to an Ultra High Temperature heat treatment of 138° C. to about 180° C. for at least 3 seconds to provide a milk-based product exhibiting a fully inactivated plasmin activity.

* * * * *